(12) United States Patent
Sugawara (10) Patent No.: US 8,638,574 B2
(45) Date of Patent: Jan. 28, 2014

(54) SEMICONDUCTOR CONTROL DEVICE FOR A SWITCHING REGULATOR AND A SWITCHING REGULATOR USING THE SEMICONDUCTOR CONTROL DEVICE

(75) Inventor: Takato Sugawara, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 105 days.

(21) Appl. No.: 13/283,765

(22) Filed: Oct. 28, 2011

(65) Prior Publication Data

US 2012/0106208 A1 May 3, 2012

(30) Foreign Application Priority Data

Nov. 2, 2010 (JP) ................................. 2010-246639

(51) Int. Cl.
*H02M 3/335* (2006.01)
(52) U.S. Cl.
USPC ...................................................... 363/21.13
(58) Field of Classification Search
USPC ............... 363/21.01–21.03, 21.07–21.13, 363/21.15–21.18, 80, 126, 127, 147; 323/265, 271, 272, 275, 282–285, 287, 323/902
See application file for complete search history.

(56) References Cited

U.S. PATENT DOCUMENTS

2010/0039835 A1* 2/2010 Shimada ................... 363/21.12

FOREIGN PATENT DOCUMENTS

| JP | 07-264850 A | 10/1995 |
|---|---|---|
| JP | 2001-298949 A | 10/2001 |
| JP | 2003-189607 A | 7/2003 |
| JP | 2007-174890 A | 7/2007 |

OTHER PUBLICATIONS

"Power IC for Quasi-Resonant Type Switching Power Supply with High Efficiency and Low Noise in Full Load Range", Sanken Electric Co., Ltd., STR-X6700 (Rev.1.3). Partial English Translation Provided, Dec. 3, 2009.

* cited by examiner

*Primary Examiner* — Timothy J Dole
*Assistant Examiner* — Carlos Rivera-Perez
(74) *Attorney, Agent, or Firm* — Rossi, Kimms & McDowell LLP (57) ABSTRACT

A semiconductor control device can include a current detection signal input terminal, a feedback signal input terminal, a driving signal output terminal and a voltage adjusting circuit that delivers a voltage similar to a voltage of a primary winding of the flyback transformer to the current detection signal input terminal. The device can also include an oscillator circuit connected to the feedback signal input terminal; a one-shot circuit connected to the oscillator circuit, an RS flip-flop circuit that generates a driving signal to be delivered to the driving signal output terminal. A bottom detection section can receive a one-shot signal from the one-shot circuit, the current detection signal, and an output signal from the RS flip-flop circuit, and detect a bottom of the current detection signal to set the RS flip-flop circuit based on the detected bottom detection signal.

10 Claims, 9 Drawing Sheets

FIG. 9
Prior Art blanking time

SEMICONDUCTOR CONTROL DEVICE FOR A SWITCHING REGULATOR AND A SWITCHING REGULATOR USING THE SEMICONDUCTOR CONTROL DEVICE

BACKGROUND OF THE INVENTION

1. Field of the Invention

Embodiments of the present invention relate to semiconductor control devices for control of a switching element connected to a flyback transformer of a switching regulator.

2. Description of the Related Art

Figure 5:
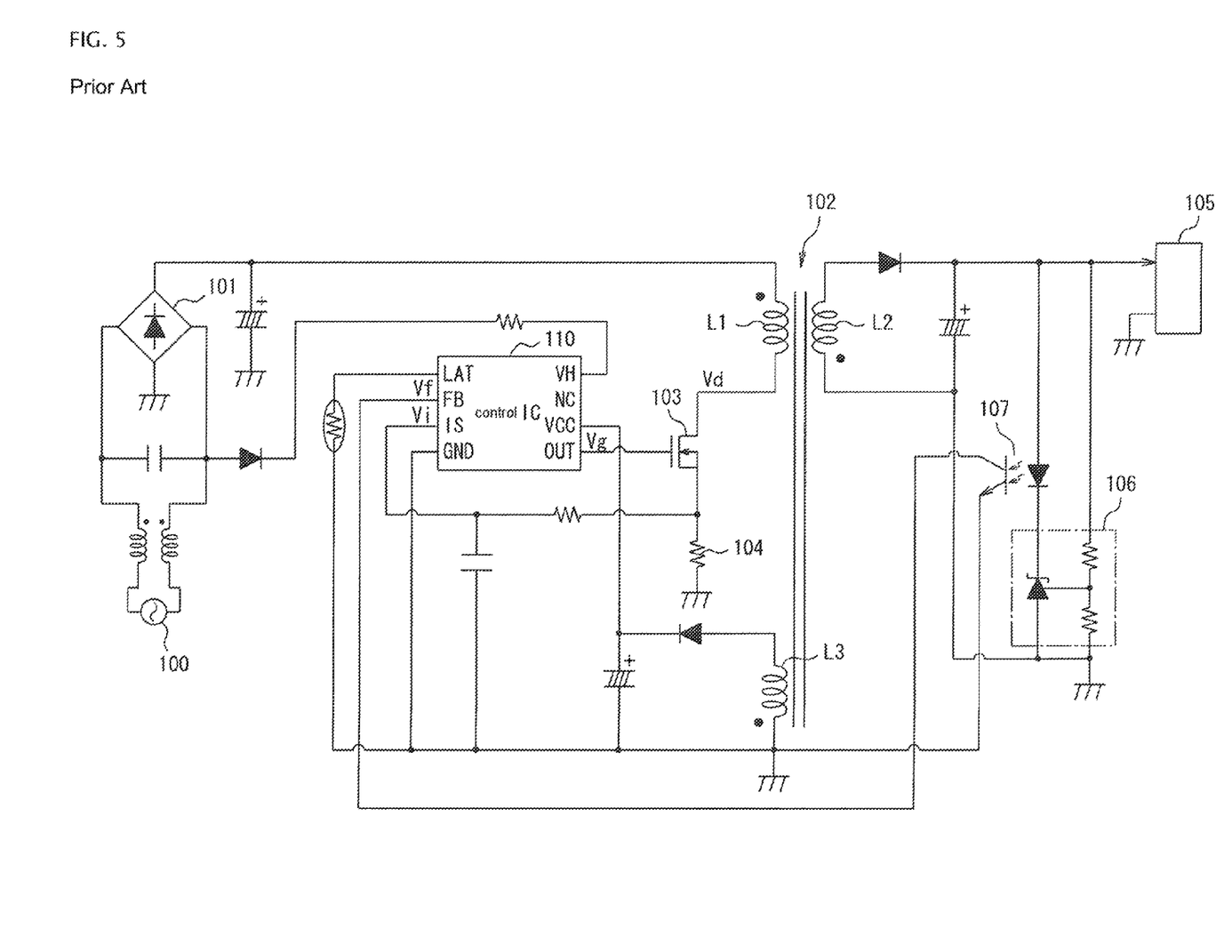
FIG. 5 is a block diagram of a conventional switching regulator.

A flyback type switching regulator has been proposed having a circuit construction as shown in FIG. 5, in which the switching element connected to the primary winding of the flyback transformer is controlled depending on whether the load connected to the secondary winding of the flyback transformer is in a light load condition or in a heavy load condition.

In the conventional example of FIG. 5, an AC voltage delivered by an AC power source 100 is converted to a DC voltage by a rectifying circuit 101, which in turn is supplied to one terminal of a primary winding L1 of a flyback transformer 102. The other terminal of the primary winding L1 is connected to the ground through a series-connected circuit consisting of a switching element 103, which is a field effect transistor, and a current sense resistance 104.

A load 105 is connected to the secondary winding L2 of the flyback transformer 102. The voltage supplied to this load is detected by a shunt regulator circuit 106 and a photo-coupler 107.

An output voltage with a waveform similar to that of the primary winding L1 of the flyback transformer 102 is obtained by an auxiliary winding L3, which is tertiary winding, with a polarity opposite to that of the primary winding L1.

A semiconductor control device 110 is provided for ON-OFF control of the switching element 103. The semiconductor control device 110 has: a power supply input terminals VH and VCC, a latch terminal LAT, a feedback signal input terminal FB, a current detection signal input terminal IS, an output terminal OUT, and a ground terminal GND. An output voltage from the auxiliary winding L3 is delivered to the power supply input terminal VCC; a current detection signal Vi, which is a voltage signal detected on a current sense resistance 104, is delivered to the current detection signal input terminal IS; and a feedback signal Vf given by a photo-coupler 107 is delivered to the feedback signal input terminal FB. The semiconductor control device 110 executes predetermined signal processing based on the delivered current detection signal Vi and the feedback signal Vf to generate a gate driving signal Vg for driving the switching element 103. The gate driving signal Vg is delivered to the gate terminal of the switching element 103.

Figure 6:
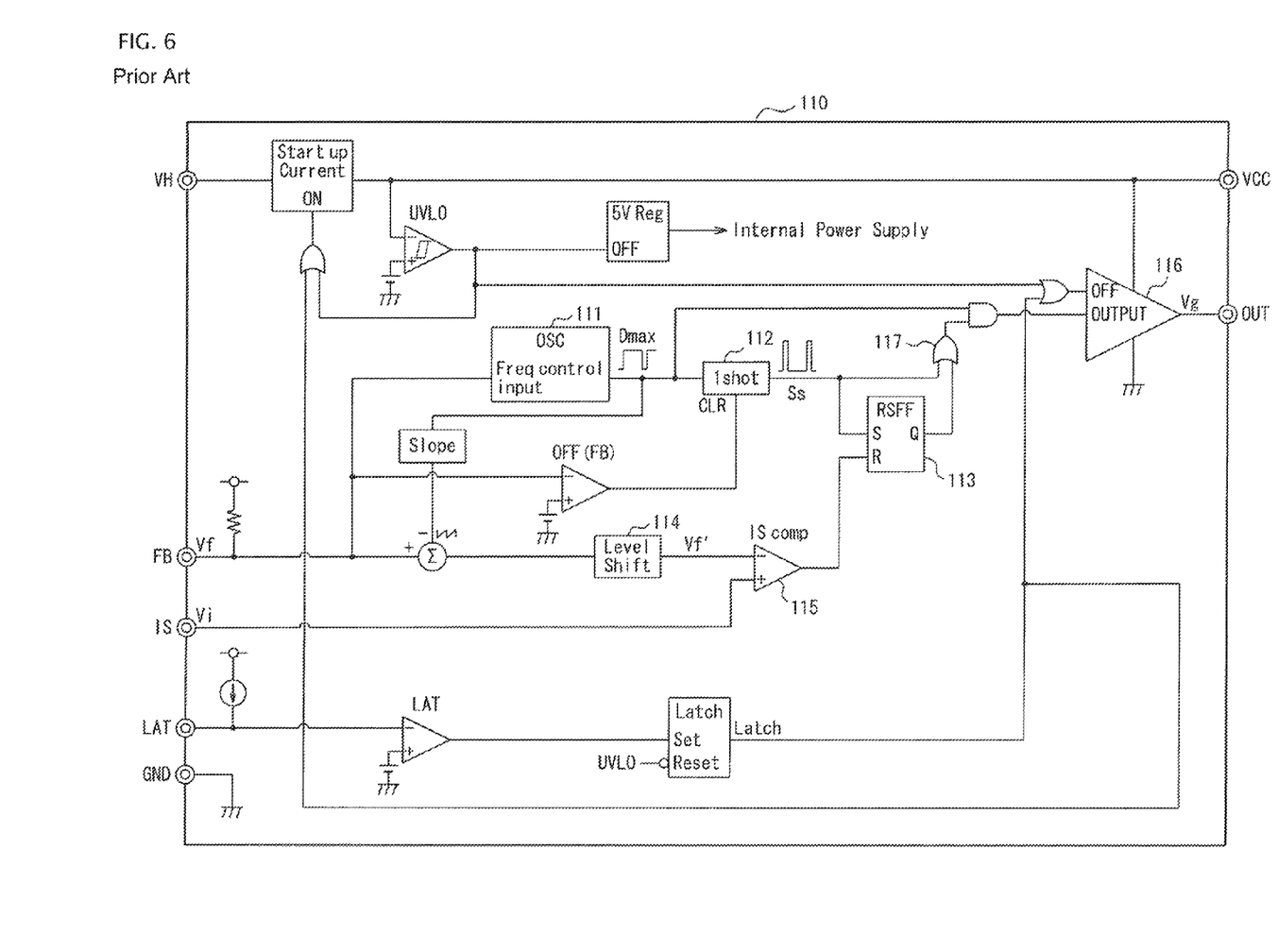
FIG. 6 is a block diagram showing a specific construction of a conventional semiconductor control device.

More specific construction of the semiconductor control device 110 is shown in FIG. 6. This semiconductor control device 110 comprises an oscillator 111, a one-shot circuit 112, an RS flip-flop circuit 113, a comparator 115, and a gate driver 116. The oscillator 111 generates oscillation with a frequency varied based on the feedback signal Vf. The one-shot circuit 112 generates a one-shot pulse at the moment of ON reversal, which is a change from an L (low) level to an H (high) level, of the output of the oscillation output of the oscillator 111. The RS flip-flop circuit 113 receives the one-shot signal from the one-shot circuit 112 at a set terminal of the RS flip-flop circuit. The comparator 115 compares the current detection signal Vi and a voltage Vf' that is the feedback signal Vf level-shifted by a level shift circuit 114, and delivers a high level signal resulting from the comparison to a reset terminal of the RS flip-flop circuit 113 when the current detection signal Vi reaches the voltage Vf'. The gate driver 116 drives the switching element 103 receiving a logical sum signal of the one-shot signal from the one-shot circuit 112 and the output from the RS flip-flop circuit 113.

Figure 7:
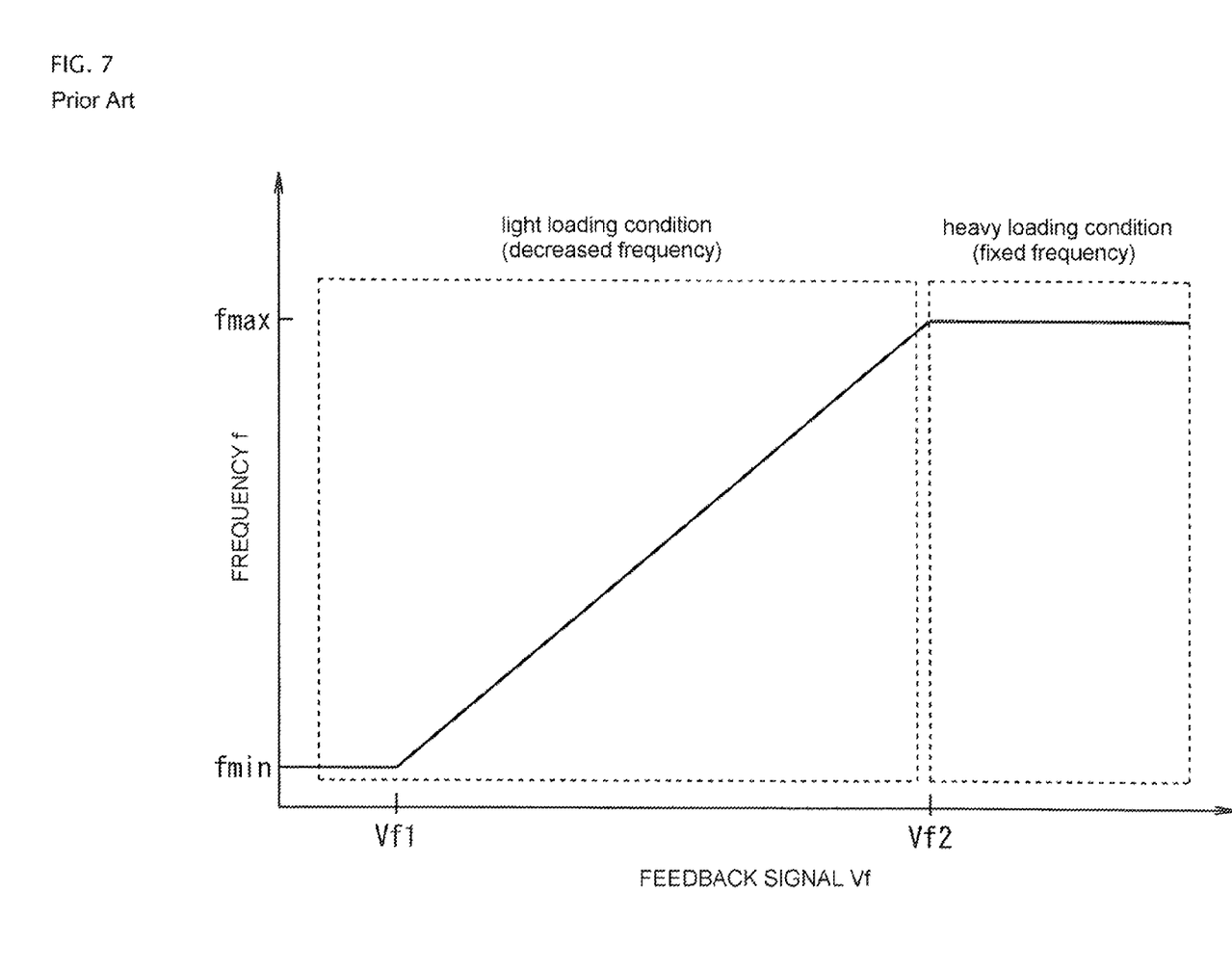
FIG. 7 shows a frequency characteristic of an oscillator in a semiconductor control device.

The feedback signal Vf is a signal indicating a magnitude of the load. Heavy loading condition, in which a large current is running in the load 105, gives a large value of the feedback signal Vf; and light loading condition, in which a small current is running in the load 105, gives a small value of the feedback signal Vf. Utilizing this characteristic, the oscillator 111 is designed in such a manner, as shown in FIG. 7, that a heavy loading condition corresponding to a rather large feedback signal Vf greater than a predetermined voltage Vf2 gives a constant frequency of the maximum frequency fmax, and a light loading condition corresponding to a feedback signal Vf smaller than the predetermined voltage Vf2 gives a frequency f that decreases with decrease of the feedback signal Vf and eventually becomes a fixed frequency of the minimum frequency fmin at a Vf value of a predetermined voltage Vf1 or less, the voltage Vf1 being sufficiently smaller than the voltage Vf2.

Operation of this conventional example is described in the following with reference to FIG. 8.

Figure 8:
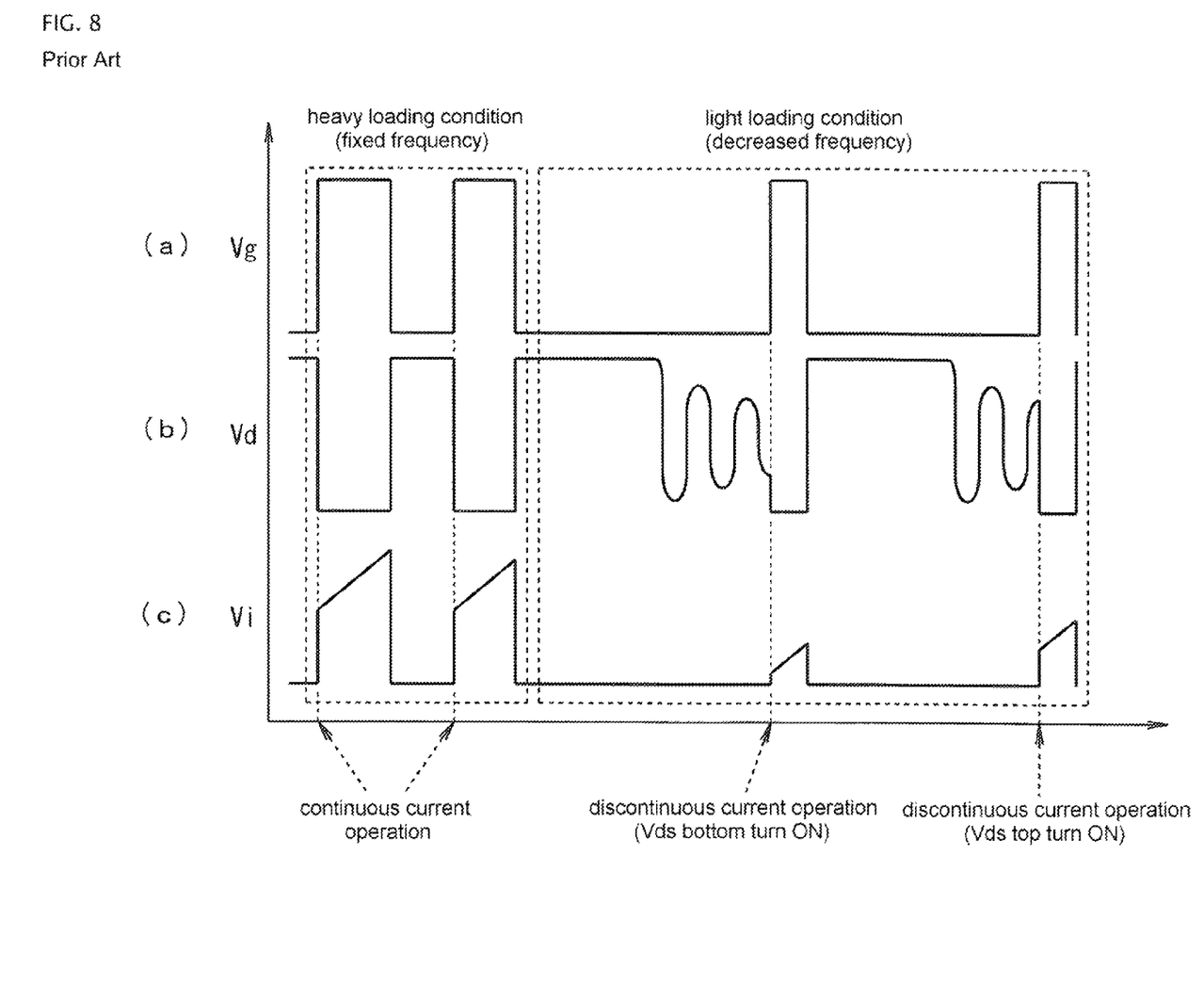
FIG. 8 shows signal waveforms in operation of a conventional switching regulator.

Referring to FIG. 8, the waveform (a) shows a gate driving signal Vg, the waveform (b) shows an electric potential Vd at the connection point between the primary winding L1 of the flyback transformer 102 and the switching element 103, and the waveform (c) shows the current detection voltage Vi. The oscillator 111 of the semiconductor control device 110 delivers an oscillation signal at a frequency f corresponding to the feedback signal Vf as shown in FIG. 7 to the one-shot circuit 112, which outputs a one-shot signal Ss. As a result, the RS flip-flop circuit 113 is set and the gate driving signal Vg at a high level as shown by the waveform (a) in FIG. 8 is delivered by the gate driver 116 to the switching element 103, to control the switching element 103 to the ON state.

DC current rectified by the rectification circuit 101 flows through the primary winding L1 of the flyback transformer 102, the switching element 103, and the current sense resistance 104, to the ground.

The current flowing in the switching element 103 is detected by the current sense resistance 104 as a voltage signal of current detection voltage Vi. The current detection voltage Vi is given to the current detection signal input terminal IS of the semiconductor control device 110. The current detection signal Vi varies as the waveform (c) of FIG. 8, for example. The voltage delivered to the load 105 that is connected to the secondary winding L2 of the flyback transformer 102 is detected by the shunt regulator circuit 106 and delivered as a feedback signal Vf to the feedback signal input terminal FB of the semiconductor control device 110 through a photo-coupler 107.

The comparator 115 executes comparison between the voltage Vf' and the current detection voltage Vi. At the moment the current detection voltage Vi reaches the voltage Vf', a signal at a high level resulted from the comparison is delivered to the reset terminal of the RS flip-flop circuit 113, to reset the RS flip-flop circuit 113. As a result, the gate driving signal Vg delivered by the gate driver 116 becomes a low level as shown in the waveform (a) of FIG. 8, turning the switching element 103 OFF.

Figure 9:
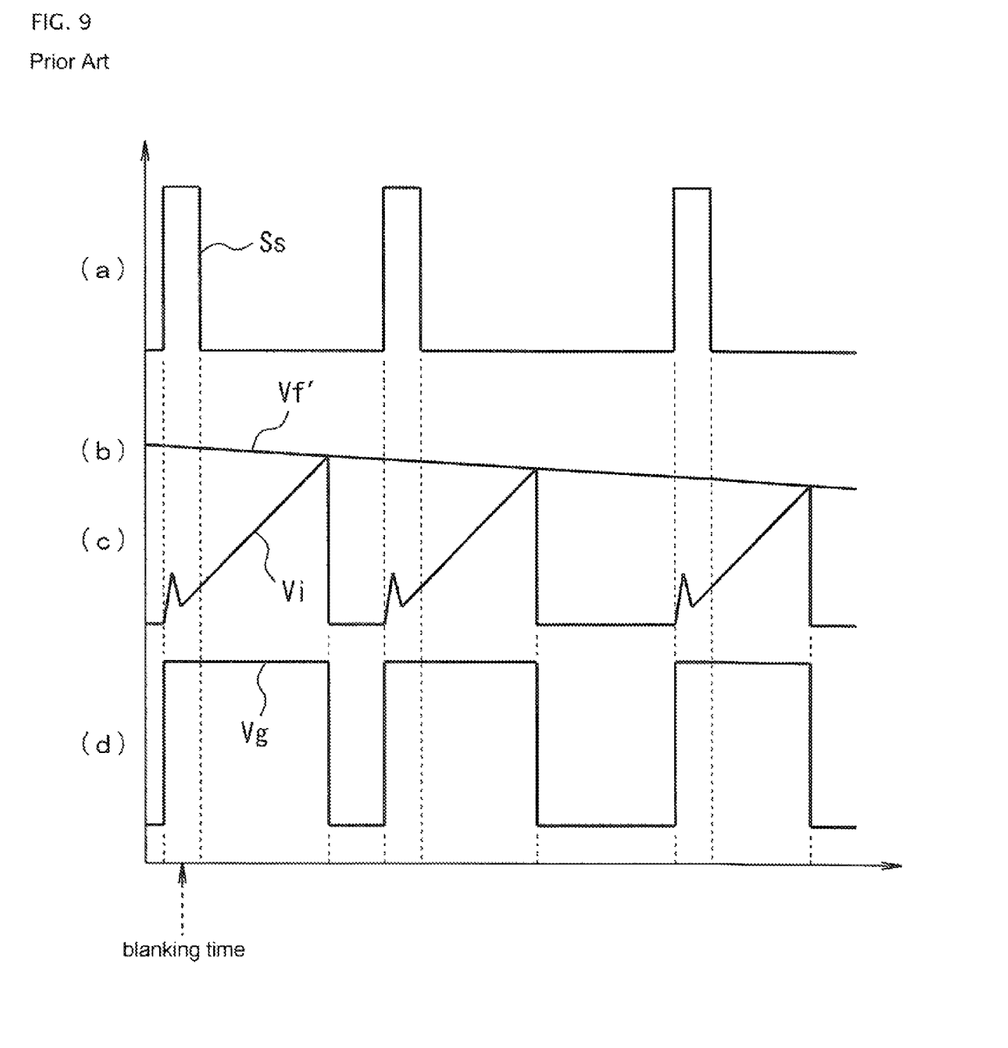
FIG. 9 shows signal waveforms in operation for suppressing a malfunction due to turn ON noises utilizing a one-shot signal Ss.

The one-shot signal Ss delivered by the one-shot circuit 112 is used as a blanking signal for inhibiting malfunction due to turn ON noise, as shown in FIG. 9. The one-shot signal Ss is given as a gate driving signal through the OR gate 117, to provide a blanking time with the time duration of the one-shot signal Ss. If a turn ON noise is generated as shown by the curve (c) of FIG. 9, malfunction of turn OFF of the semiconductor element 103 is inhibited.

In the heavy loading condition of the load 105 in the side of the secondary winding L2 of the flyback transformer 102, the oscillation frequency of the oscillator 111 in the semiconductor control device 110 is fixed at the maximum frequency fmax as shown in FIG. 7. The switching element 103 repeats turning ON and turning OFF at the maximum frequency fmax. Here, the frequency characteristics of the flyback transformer 102 is designed so that the switching element 103 operates in a continuous current mode, in which the switching element 103 makes the next turn ON operation during the flyback transformer 102 is transmitting an electric power to the secondary side.

On the other hand, in the light loading condition, the oscillation frequency of the oscillator 111 decreases as shown in FIG. 7. In the loading below a certain degree, the operation becomes a discontinuous current mode, in which the switching element 103 makes the next turning ON operation after the flyback transformer 102 finishes transmitting an electric power to the secondary side. In the discontinuous current mode operation, after completion of power transmission to the secondary side, LC resonance oscillation arises due to an inductance component of the primary winding L1 of the flyback transformer 102 and capacitance components of a parasitic capacitance of the switching element and a capacitance of a noise suppression capacitor (not shown in the figures). Consequently, the voltage Vd varies as shown in the waveform (b) in FIG. 8.

Because the turn ON timing of the switching element 103 is regulated by the oscillator 111 in the semiconductor control device 110, it is determined at random whether turning ON of the switching element 103 occurs at a moment of high voltage in the resonance oscillation of the drain voltage Vd, which is referred to as 'top turning ON', or at a moment of low voltage in the resonance oscillation, which is referred to as 'bottom turning ON'.

Owing to the decreased switching frequency, the switching loss in the switching element 103 is smaller than the magnitude in the heavy loading condition. However, the switching loss is rather large in the top turning ON condition in which turning ON occurs at a moment of high voltage in the resonance oscillation due to discharge of the capacitance component in the LC resonance circuit, as compared with the bottom turning ON condition in which turning ON occurs at a moment of low voltage in the resonance oscillation.

In order to deal with this problem, it has been considered to provide a bottom detection circuit outside the semiconductor control device 110 for detecting a bottom condition during switching of the switching element 103. To provide such a bottom detection circuit, a dedicated input terminal is needed for delivering the bottom detection signal from the bottom detection circuit to the semiconductor control device 110. Thus, problems arise due to the increased number of pins in the semiconductor control device 110 and increased cost of the semiconductor control device 110.

To cope with the problems, Non-patent Document 1 discloses a switching regulator that performs detection of a bottom condition in the drain voltage Vd of a MOSFET connected to the primary winding of the flyback transformer. This detection of bottom condition is carried out by delivering a voltage given by an auxiliary winding L3 of the flyback transformer 102, the voltage having a similar waveform to the one in the primary winding, to an overcurrent protection input/bottom detection terminal, which corresponds to the current detection signal input terminal IS. In the LC resonance oscillation state in this switching regulator, a first control mode in the heavy loading condition and a second control mode in the light loading condition are interchanged. In the first control mode, the bottom turn ON of the MOSFET is conducted on detection of the bottom condition in the heavy loading condition. In the second control mode, the bottom turning ON of the MOSFET is conducted when the bottom condition is detected twice after once skipping the bottom condition in the light loading condition. Thus, the switching frequency is decreased in the light loading condition and the switching loss is reduced.

In the conventional example disclosed in "STR-X6700 Series Application Note (Rev. 1.3)," pages 12-14, delivered by Sanken Electric Co., Ltd. (Searched and found on Oct. 6, 2010 on the Internet) (referred to herein as "Non-patent Document 1"), the control mode is interchanged between the first control mode in which skip of bottom condition is not conducted in the heavy loading condition and the second control mode in which skip of bottom condition is conducted once in the light loading condition.

The light loading there means a short period of time for storing energy in the flyback transformer and a short period of time for transmitting the energy from the primary side to the secondary side of the flyback transformer. A switching period is a sum of the energy storage and transmission time and one or two periods of the free oscillation. Therefore, a lower loading condition generally results in a higher switching frequency, increasing energy loss.

In the control device of Non-patent Document 1, when the loading becomes light, the number of skip of the bottom condition is increased from '0' to '1', reducing the switching frequency at that moment. After that time, however, the switching frequency increases with decrease of loading, this is one of the problems in the control device of Non-patent Document 1. In the heavy loading condition, since the resonant oscillation is presumed in this conventional device, the continuous current mode operation cannot be performed.

SUMMARY OF THE INVENTION

In view of the unsolved problems of the conventional examples described above, embodiments of the present invention can provide such a semiconductor control device for a switching regulator that achieves a continuous current mode in the heavy loading condition and performs bottom turning ON during resonance oscillation operation in the light loading condition without increasing the number of pins in the semiconductor control device for driving a switching element for the flyback transformer. A semiconductor control device of certain embodiments can further perform optimum switching characteristics. Embodiments of the present invention can also provide a switching regulator using such a semiconductor control device.

As such, a semiconductor control device for a switching regulator according to embodiments of the present invention is a semiconductor control device for a switching regulator that has a switching element connected in series to a primary winding of a flyback transformer and connects a secondary winding of the flyback transformer to an external load. The semiconductor control device drives the semiconductor element and comprises: a current detection signal input terminal that receives a signal of detected current flowing in the switching element; a feedback signal input terminal that receives a feedback signal of detecting a loading condition of the secondary winding; a driving signal output terminal that delivers a signal for driving the switching element; a voltage adjusting circuit that connects an output terminal of an auxiliary winding of the flyback transformer, the auxiliary winding having a polarity opposite to the primary winding, to the current detection signal input terminal during an OFF state of the switching element; an oscillator circuit that is connected to the feedback signal input terminal; a one-shot circuit that generates a one-shot pulse based on an output voltage from the oscillator circuit; an RS flip-flop circuit that generates a driving signal to be delivered to the driving signal output terminal; and a bottom detection section that receives a one-shot signal from the one-shot circuit, the signal delivered to the current detection signal input terminal, and an output signal from the RS flip-flop circuit, and sets the RS flip-flop circuit based on the one-shot signal or a bottom detection signal of detecting a bottom of the signal delivered to the current detection signal input terminal during an OFF period of the switching element.

The bottom detection section of the semiconductor control device for a switching regulator of the invention can comprises: a pull-down circuit that pulls down the current detection signal input terminal upon receiving the output signal from the RS flip-flop circuit; a hysteresis comparator that is connected to the current detection signal input terminal; a counter that is counted up every time a comparison output is delivered from the hysteresis comparator is received and is reset upon setting of the RS flip-flop circuit; a second RS flip-flop circuit that is set at a predetermined count value of the counter and reset upon setting of the RS flip-flop circuit; an AND gate that receives the comparison output signal from the hysteresis comparator and an output signal from the second RS flip-flop circuit; a bottom detection circuit that delivers a one-shot signal upon change of an output signal from the AND gate from a high level to a low level; a gate circuit that passes the one-shot signal from the one-shot circuit through the gate circuit corresponding to a condition of the output signal from the AND gate at the low level; and an OR gate that delivers a set signal to the RS flip-flop circuit, the set signal being a logical sum signal of an output signal from the bottom detection circuit and an output signal from the gate circuit.

In a semiconductor control device for a switching regulator of embodiments of the invention, the bottom detection circuit can comprise: a D flip-flop circuit that receives the output signal from the AND gate at a data input terminal and the one-shot signal from the one-shot circuit at a clock terminal; a second AND gate that receives an output signal from the D flip-flop circuit and the output signal from the AND gate; and a second one-shot circuit that delivers a one-shot signal upon change of an output signal from the second AND gate from the high level to the low level.

The semiconductor control device for a switching regulator of embodiments of the invention, the voltage adjusting circuit can include a diode having an anode connected, through a current limiting resistance, to the auxiliary winding and a cathode connected to the current detection signal input terminal, and delivers an output signal from the auxiliary winding to the current detection signal input terminal during the OFF period of the switching element.

In certain embodiments of the semiconductor control device for a switching regulator of the invention, the predetermined value of the count value is two.

A switching regulator according to embodiments of the present invention controls a switching element connected to t primary winding of a flyback transformer using the semiconductor control device for a switching regulator according to the embodiments of the invention as stated above.

A semiconductor control device for a switching regulator according to embodiments of the invention can perform turning ON of a switching element connected to the primary winding of the flyback transformer at a time of a low drain voltage during an LC resonant oscillation state in the discontinuous current mode in the light loading condition without increasing the number of pins in the semiconductor control device for controlling the switching element. Therefore, the semiconductor control device of embodiments of the invention reduces the switching loss in the light loading condition to enhance efficiency while suppressing increase in the manufacturing costs of the device. Moreover, the semiconductor control device of embodiments of the invention can perform optimum switching frequency characteristics corresponding to a loading state in the light loading condition.

DETAILED DESCRIPTION OF THE INVENTION

Now, circuits for signal transmission in some embodiments of a switching regulator and a semiconductor control device according to embodiments of the present invention will be described in the following with reference to accompanying drawings.

Figure 1:
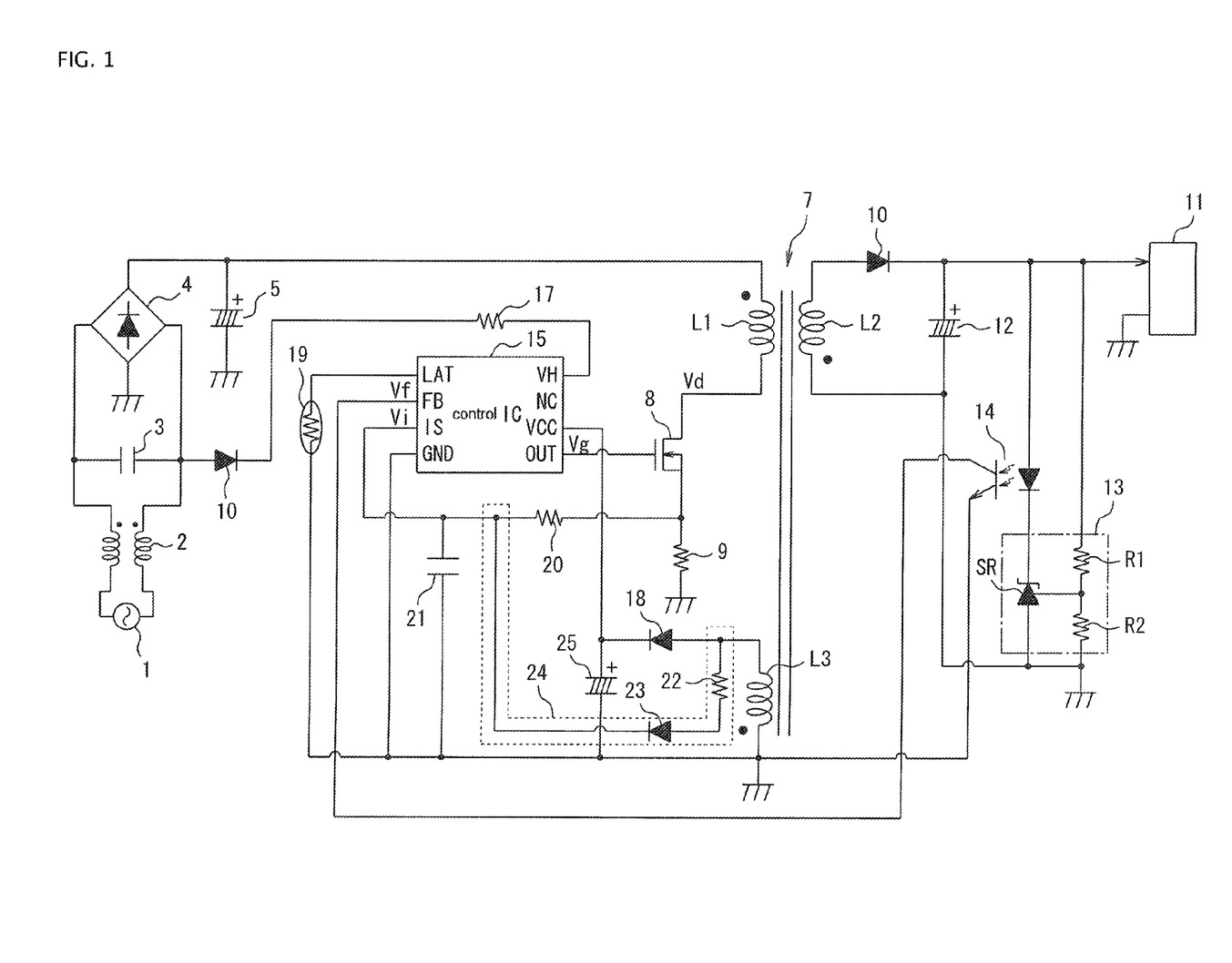
FIG. 1 is a block diagram of an embodiment of a switching regulator according to the present invention.

FIG. 1 is a block diagram of a switching regulator of certain embodiments of the present invention.

Referring to FIG. 1, the reference numeral 1 represents an AC power source that supplies AC power to a rectifier 4 through an input filter consisting of an inductor 2 and a capacitor 3.

The rectifier 4 converts the supplied AC voltage to a DC voltage. A smoothing capacitor 5 is connected between the positive electrode and the negative electrode of the rectifier 4. The DC output voltage from the rectifier 4 is delivered to one terminal of the primary winding L1 of the flyback transformer 7. The other terminal of the primary winding L1 is grounded through a series circuit of a switching element 8, which can be an N channel field effect transistor, and a current sense resistance 9.

One end of the secondary winding L2 of the flyback transformer 7 is connected through a diode 10 to the load 11. The other end of the secondary winding L2 is directly grounded. A smoothing capacitor 12 is connected in parallel to a series circuit of the secondary winding L2 and the diode 10. A voltage supplied to the load 11 is detected by a shunt regulator circuit 13 composed of shunt resistances R1, R2, and a shunt regulator SR. The detected voltage is delivered to the semiconductor control device 15 as a feedback signal Vf through a photo-coupler 14. The feedback signal Vf is a signal indicating a magnitude of loading: heavy loading, in which the current in the load 11 is relatively large, corresponds to a large value of the feedback signal Vf; and light loading, in which the current in the load 11 is relatively small, corresponds to a small value of the feedback signal Vf.

The semiconductor control device 15 controls driving of the switching element 8 and is composed of a semiconductor integrated circuit (IC). The semiconductor device 15 has terminals: a power supply input terminal VH, another power supply input terminal VCC, a latch terminal LAT, a feedback signal terminal FB, a current detection signal input terminal IS, an output terminal OUT, and a ground terminal GND. The power supply input terminal VH receives a power delivered from a connection point between a capacitor 3 and an inductance 2 that is connected to the AC power supply 1, through a diode 16 and a current limiting resistance 17. Another power supply input terminal VCC receives power from the auxiliary winding L3 (tertiary winding) of the flyback transformer 7 through a diode 18. The latch terminal LAT is connected to one terminal of a thermistor 19, the other terminal of which is grounded, and receives a signal for overheat latching protection. The feedback signal terminal FB receives a feedback signal Vf from the photo-coupler 14. The current detection signal input terminal IS receives a current detection voltage Vi that corresponds to a detected current value converted to a voltage by the current sense resistance 9, through the resistance 20. The output terminal OUT delivers a gate driving signal Vg to the gate of the switching element 8. The ground terminal GND is connected to the ground.

A capacitor 21 composing a noise filter is connected between the ground and a connection point of the current detection signal input terminal IS and the resistance 20. A voltage adjusting circuit 24 composed of series-connected circuit of a current limiting resistance 22 and a diode 23 is connected between the current detection signal input terminal IS and the auxiliary winding L3 of the flyback transformer 7. An anode of the diode 23 is connected to the side of the auxiliary winding L3, and a cathode of the diode 23 is connected to the current detection signal input terminal IS. A signal from the auxiliary winding L3 is delivered to the current detection signal input terminal IS during the period of turn OFF of the switching element 8. The reference numeral 25 represents a smoothing capacitor connected between the power supply input terminal VCC and the ground.

Figure 2:
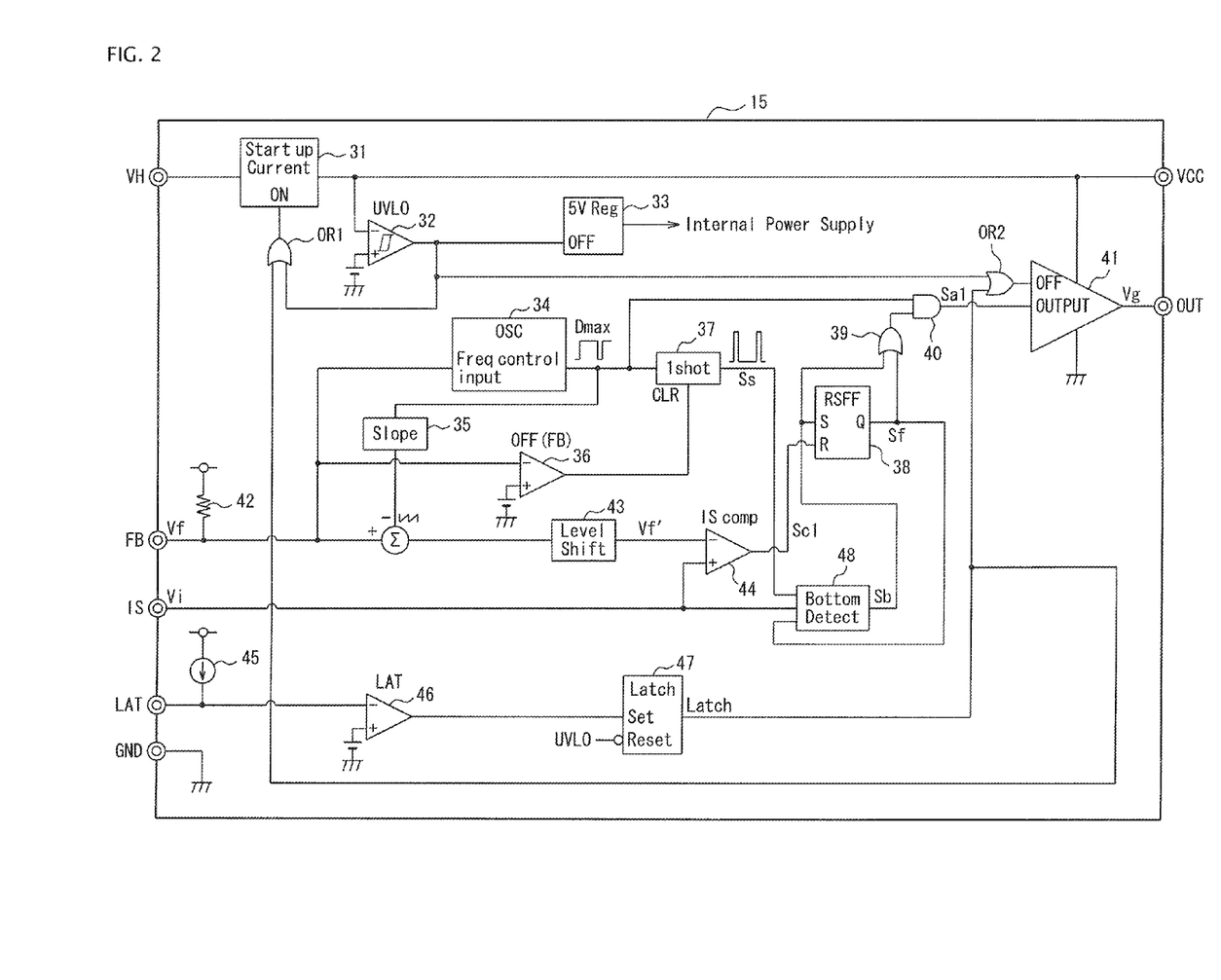
FIG. 2 is a block diagram showing a specific construction of the semiconductor control device in the switching regulator of FIG. 1.

The specific construction of the semiconductor control device 15 comprises, as shown in FIG. 2, a start up circuit 31, a low voltage malfunction inhibiting circuit 32, and an internal power supply circuit 33. The start-up circuit 31 is connected between the power supply terminals VH and VCC and supplies electric current from the power supply terminal VH to the power supply terminal VCC at the starting time. The low voltage malfunction inhibiting circuit 32 is connected between the start-up circuit 31 and the power supply terminal VCC and stops operation of the semiconductor control device 15 if a voltage at the power supply terminal VCC is lower than a certain value. The internal power supply circuit 33 receives the output voltage from the low voltage malfunction inhibiting circuit 32. The power supply terminal VH supplies a current to the power supply terminal VCC at the start-up time, and the main power supply terminal of the semiconductor control device 15 is the power supply terminal VCC.

The low voltage malfunction inhibiting circuit 32 also delivers a start-up signal to the start-up circuit 31 through an OR gate OR1.

The semiconductor control device 15 comprises an oscillator 34 connected to the feedback signal input terminal FB. This oscillator 34 has a construction similar to that of the oscillator 111 in FIG. 6 in the previous description on the conventional semiconductor control device 110, and exhibits the frequency characteristics shown in FIG. 7 with respect to the feedback signal Vf.

The oscillator 34 is connected, at the output terminal thereof, to a slope compensation circuit 35 for inhibiting generation of sub-harmonic oscillation and a one-shot circuit 37 for generating a one-shot signal Ss having a predetermined relatively short pulse width. The one-shot circuit 37 receives, at an inversion input terminal CLR thereof, a comparison output from a comparison circuit 36 for stopping switching operation of the switching element 8 in a low voltage condition of the feedback signal Vf.

The semiconductor control device 15 comprises an RS flip-flop circuit 38 that receives, at a set terminal S thereof, an output signal Sb from a bottom detection section 48, which will be described in detail afterwards. The RS flip-flop circuit 38 delivers an output signal from the output terminal Q thereof through an OR gate 39 to an AND gate 40. The OR gate 39 also receives the output signal Sb from the bottom detection section 48. The AND gate 40 also receives the output oscillation signal from the oscillator 34.

The output signal Sa0 from the AND gate 40 is delivered to a gate driver 41, which in turn delivers a gate driving signal Vg through the output terminal OUT to the gate of the switching element 8.

The semiconductor control device 15 comprises: a resistance 42 for supplying a current through the feedback signal terminal FB to the photo-coupler 14, a level shifting circuit 43 for shifting the level of the feedback signal Vf, and a comparator 44 that receives a level-shifted feedback signal Vf' delivered from the level shifting circuit 43 and the current detection voltage Vi supplied to the current detection signal input terminal IS. The comparator 44 delivers a comparison signal Sc1 at a high level when the current detection voltage Vi reaches the level-shifted feedback signal Vf'. The comparison signal Sc1 is delivered to the reset terminal R of the RS flip-flop circuit 38.

The semiconductor control device 15 comprises: a current source 45 for supplying a current to the latch terminal LAT, a comparator 46 for detecting a lowered voltage at the latch terminal LAT, and a latching circuit 47 receiving the output voltage from the comparator 46 at the set terminal SET of the latching circuit 47. The latching circuit 47 delivers a latching signal Latch that becomes a high level at the time of overheat protection. The latching signal Latch is delivered through an OR gate OR 2 to an OFF terminal OFF of the gate driver 41. The OR gate OR 2 also receives an output voltage from the low voltage malfunction inhibiting circuit 32. The gate driver 41 delivers a signal to turn the switching element 8 OFF when the input signal to the OFF terminal OFF thereof turns to a high level.

The semiconductor control device 15 comprises a bottom detection section 48 that receives the one-shot signal Ss delivered from the one-shot circuit 37 and an output signal Sf delivered from the RS flip-flop circuit 38. The bottom detection section 48 executes signal processing based on these input signals and outputs a bottom detection signal Sb. The bottom detection signal Sb from the bottom detection section 48 is delivered to the set terminal of the RS flip-flop circuit 38 and also to the OR gate 39.

Figure 3:
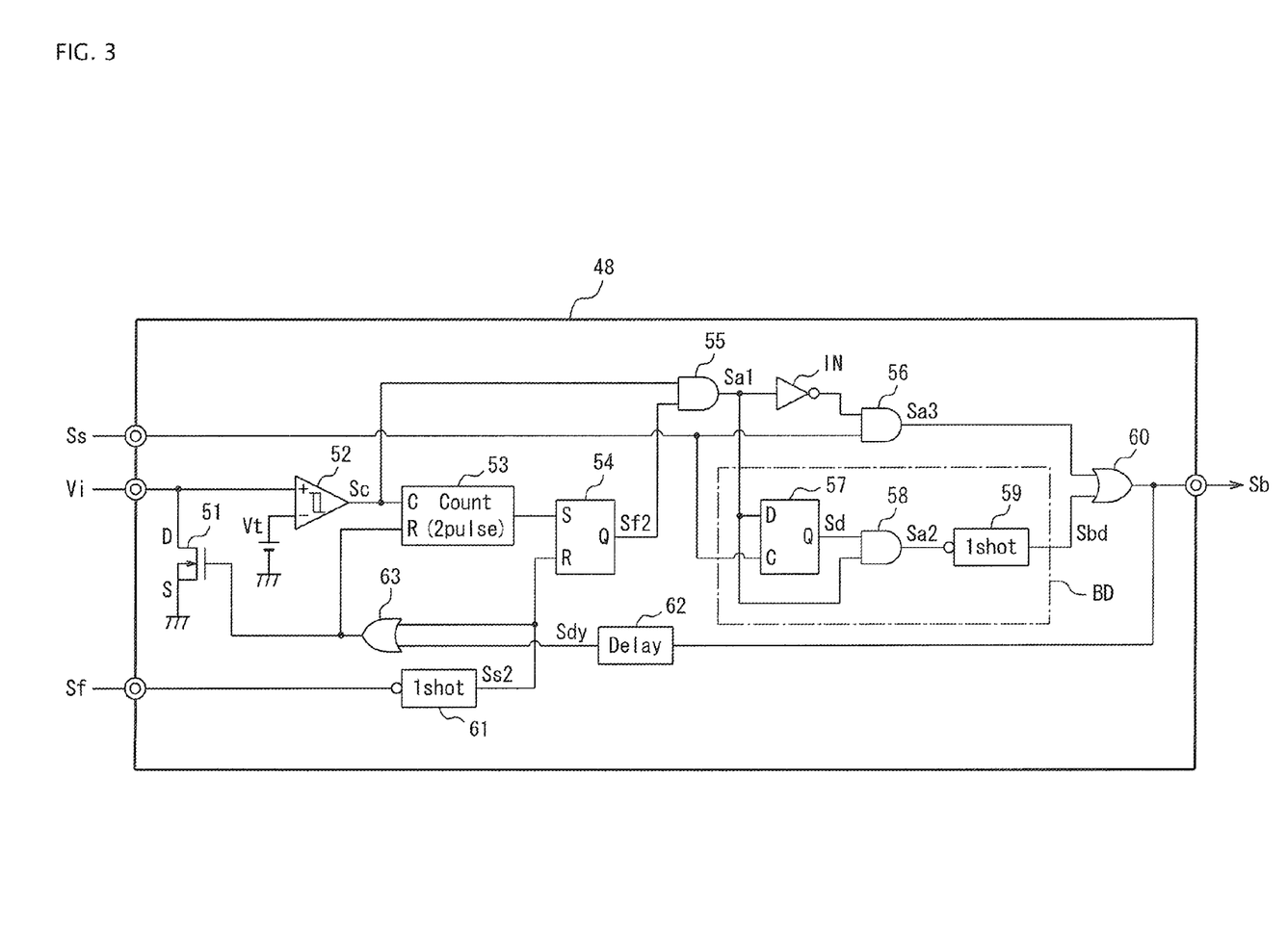
FIG. 3 is a block diagram of a specific construction of the bottom detection section in the semiconductor control device of FIG. 2.

The specific construction of the bottom detection section 48 is illustrated in FIG. 3. Referring to FIG. 3, the bottom detection section 48 comprises a switching element 51, a hysteresis comparator 52, and a counter 53. The switching element 51 is, for example, an N channel field effect transistor to pull-down (or to connect to the ground) the current detection voltage Vi. The hysteresis comparator 52 receives the current detection voltage Vi and a threshold voltage Vt, and delivers a comparison signal Sc at a high level to the counter 53 when the current detection voltage Vi reaches the threshold voltage Vt. The counter 53 receives a comparison signal Sc from the hysteresis comparator 52 at the count terminal C of the counter 53 and a one-shot signal Ss2 from a third one-shot circuit 61 at the reset terminal R. (A second one-shot circuit is the one-shot circuit 59 indicated in FIG. 3 and described in paragraph [0038] below.) The counter 53 delivers a count-up signal that is a high level pulse at the timing of count value "2".

The bottom detection section 48 comprises a second RS flip-flop circuit 54 and an AND gate 55. The second RS flip-flop 54 receives a count-up signal from the counter 53 at the set terminal S and a one-shot signal Ss2 from the third one-shot circuit 61 at the reset terminal R. The AND gate 55 receives an output signal Sf2 from the second RS flip-flop circuit 54 and the comparison signal Sc from the hysteresis comparator 52.

The bottom detection section 48 has an AND gate 56 that receives an output signal Sa1 from the AND gate 55 through an inverter IN and the one-shot signal Ss from the one-shot circuit 37.

The bottoms detection section 48 comprises a bottom detection circuit BD that receives the output signal Sa1 from the AND gate 55 and the one-shot signal Ss from the one-shot circuit 37. The bottom detection circuit BD includes a D flip-flop circuit 57, an AND gate 58, and a second one-shot circuit 59. The D flip-flop circuit 57 receives the output signal Sa1 from the AND gate 55 at the data input terminal D and the one-shot signal Ss from the one-shot circuit 37 at the clock input terminal C. The AND gate 58 receives an output signal Sd from the D flip-flop circuit 57 and the output signal Sa1 from the AND gate 55. The second one-shot circuit 59 receives an output signal Sa2 from the AND gate 58 and delivers a one-shot signal Sbd with a predetermined pulse width upon reversal of the output signal Sa2 from the high level to the low level.

The bottom detection section 48 comprises an OR gate 60 that receives an output signal Sa3 from the AND gate 56 and the one-shot signal Sbd from the second one-shot circuit 59 of the bottom detection circuit BD. The OR gate 60 delivers a bottom detection signal Sb to the set terminal S of the RS flip-flop circuit 38 and to the OR gate 39.

The bottom detection section 48 comprises the third one-shot circuit 61 and a delay circuit 62. The third one-shot circuit 61 receives an output signal Sf from the RS flip-flop circuit 38 and delivers a one-shot signal Ss2 with a predetermined relatively short pulse width upon reversal of the output signal Sf from the high level to the low level. The delay circuit 62 delays the bottom detection signal Sb from the OR gate 60. The one-shot signal Ss2 from the third one-shot circuit 61 is delivered to the reset terminal R of the second RS flip-flop circuit 54 and, through the OR gate 63, to the reset terminal R of the counter 53 and the gate of the switching element 51.

Operation of the embodiment of the semiconductor control device and the switching regulator of the invention described above will be described in the following.

In the heavy loading condition of the load 11 connected to the secondary winding L2 of the flyback transformer 7, the embodiment device operates in the similar manner as the conventional example of FIG. 5 as described previously. Consequently, detailed description thereon is omitted here. However, operation in LC resonant oscillation, which is pseudo-resonant oscillation, in a light loading condition in the embodiment device is different from that of the conventional example described previously. Accordingly, this point is described here with reference to the signal waveforms in FIG. 4.

Figure 4:
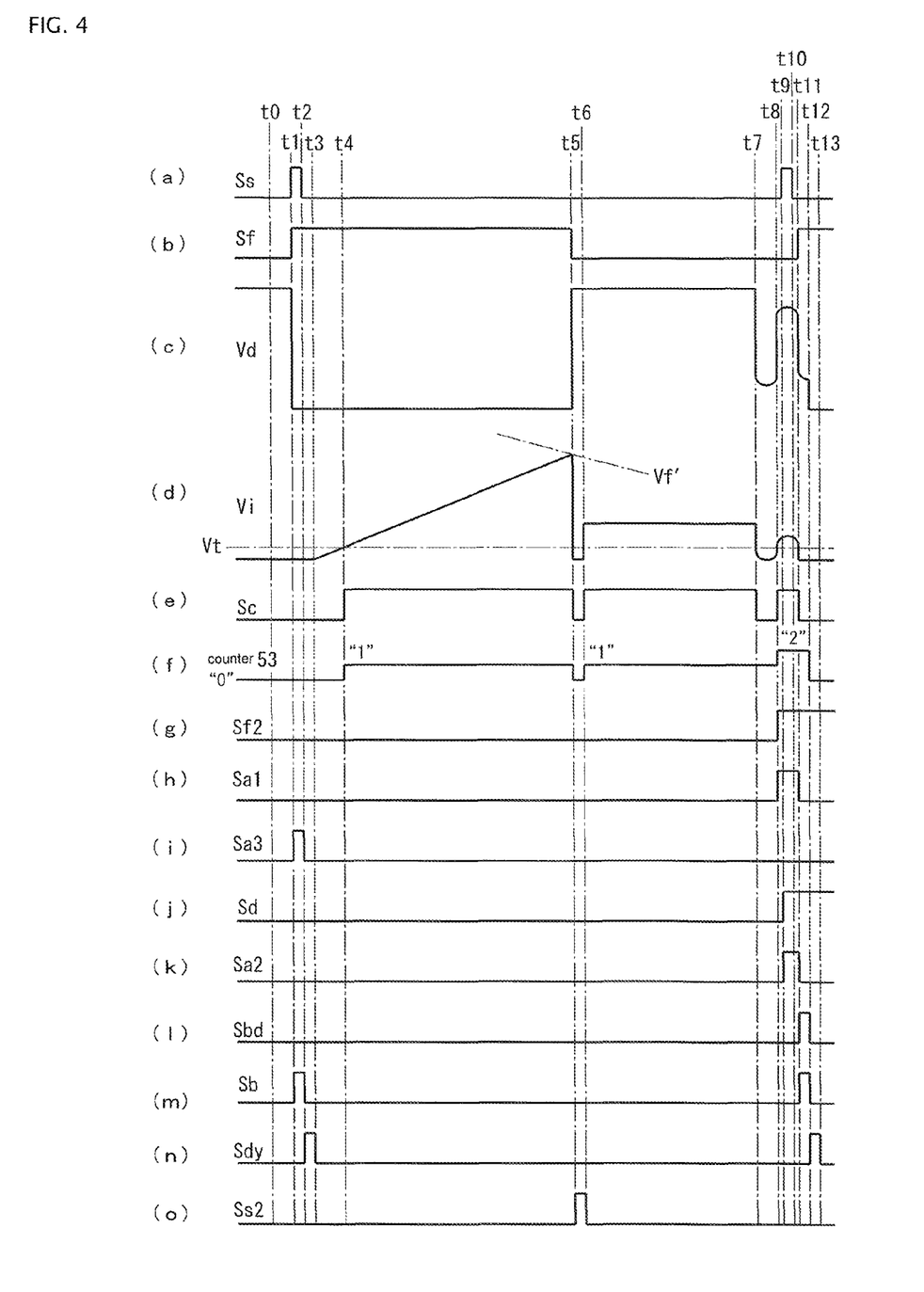
FIG. 4 shows signal waveforms illustrating operation of the semiconductor control device of embodiments of the invention.

FIG. 4 shows signal waveforms in the embodiment of the semiconductor control device that is in the heavy loading condition until the time t0, and becomes to a light loading condition after the time t0. In the light loading condition, the oscillator 34 of the semiconductor control device 15 delivers an oscillation signal with a lowered frequency f and accordingly, the one-shot circuit 37 delivers a one-shot signal Ss with a relatively long interval as shown by the waveform (a) in FIG. 4.

At the time t0 at which the one-shot signal Ss is not formed yet, it is assumed that the RS flip-flop circuit 38 in FIG. 2 has been reset and the output signal Sf is at the low level. As a result, the gate driving signal Vg delivered from the gate driver 41 stays at the low level. Consequently, the switching element 8 is in the OFF state and the drain voltage Vd is at a relatively high voltage as shown by the waveform (c) in FIG. 4.

In this OFF state of the switching element 8, the current flowing in the current sense resistance 9 is approximately zero and the voltage drop in the sense resistance 9 is also approximately zero, which means that the electric potential at the connection point between the current sense resistance 9 and the resistance 20 is approximately zero. Until the time t1, an electric current is supplied to the load 11 from the secondary winding L2 of the flyback transformer through the diode 10 and the electric potential at the connection point between the diode 10 and the secondary winding L2 is at a positive potential. Accordingly, the potential at the connection point between the auxiliary winding L3 of the flyback transformer 7 and the diode 23 is at a negative potential. The current detection voltage Vi delivered to the current detection signal input terminal IS of the bottom detection section 48 is also approximately zero as shown by the waveform (d) in FIG. 4. The comparison signal Sc from the hysteresis comparator 52 stays at a low level as shown by the waveform (e) in FIG. 4.

The comparison signal Sc of the hysteresis comparator 52 is delivered to the counter 53, which has a count value zero. The second RS flip-flop circuit 54 is in a reset state, and the output signal Sf2 from there is at the low level as shown by the waveform (g) in FIG. 4.

As a result, the output signal Sa1 from the AND gate 55 is also at the low level as shown by the waveform (h) in FIG. 4. This signal Sa1 is inverted by the inverter IN to the high level and delivered to the AND gate 56. However, since the AND gate 56 has not received a one-shot signal Ss from the one-shot circuit 37 yet at this moment t0, the output Sa3 from the AND gate 56 stays at the low level as indicated by the waveform (i) in FIG. 4.

It is presumed that the output Sd from the D flip-flop circuit 57 is at the low level at this moment to as shown by the waveform (j) of FIG. 4. So, the output Sa2 from the AND gate 58 stays at the low level as shown by the waveform (k) in FIG. 4, and the bottom detection signal Sbd, which is an output of the second one-shot circuit 59, remains at the low level as shown by the waveform (l) in FIG. 4. Consequently, the bottom detection signal Sd, which is an output of the OR gate 60, remains at the low level as shown by the waveform (m) in FIG. 4; the delay signal Sdy from the delay circuit 62 remains at the low level as shown by the waveform (n) in FIG. 4; the output signal Sf from the RS flip-flop circuit 38 remains at the low level; and the one-shot signal Ss2 from the third one-shot circuit 61 also remains at the low level as shown by the waveform (o) in FIG. 4.

After this state, at the time t1 when the oscillation output signal from the oscillator 34 changes from the low level to the high level, a one-shot signal Ss with a relatively short pulse width as shown by the waveform (a) in FIG. 4 is delivered from the one-shot circuit 37 to the bottom detection section 48.

In the bottom detection section 48, at the moment of time t1, the output signal Sa1 from the AND gate 55 remains at the low level and is delivered to the AND gate 56 after inversion by the inverter IN. Consequently, the one-shot signal Ss passes through this AND gate 56, and the bottom detection signal Sb is delivered from the OR gate 60 to the set terminal of the RS flip-flop circuit 38 and the OR gate 39.

Accordingly, the RS flip-flop circuit 38 is set and the output signal Sf from the RS flip-flop circuit 38 changes from the low level to the high level as shown by the waveform (b) in FIG. 4. This output signal Sf at the high level passes through the OR gate 39 and the AND gate 40 and delivered to the gate driver 41. The gate driving signal Vg delivered from the gate driver 41 changes to the high level, turning the switching element 8 ON. As a result, the drain voltage Vd of the switching element 8 drops to a low voltage as shown in the waveform (c) in FIG. 4.

At this time, the delay circuit 62 delivers a delay output signal Sdy with a pulse width corresponding to the one-shot signal Ss as shown by the waveform (n) in FIG. 4. This delay output signal Sdy is delivered through the OR gate 63 to the second switching element 51. The second switching element 51 turns ON to pull down the current detection voltage Vi holding the current detection voltage Vi at the zero level as shown by the waveform (d) in FIG. 4. This delay signal Sdy is also delivered through the OR gate 63 to the reset terminal R of the counter 53 to clear the count value of the counter 53 to zero.

After that, at the moment of time t2 when the one-shot signal Ss from the one-shot circuit 37 returns to the low level as shown by the waveform (a) in FIG. 4, the output signal from the AND gate 56 returns to the low level as shown by the waveform (i) in FIG. 4 and the bottom detection signal Sb from the OR gate 60 returns to the low level as well as shown by the waveform (m) in FIG. 4.

After that, at the moment of time t3 when the delay signal Sdy returns to the low level as shown by the waveform (n) in FIG. 4, the current detection voltage Vi is released from the pull-down state and start to increase linearly as shown by the waveform (d) in FIG. 4. At the moment of time t4 when the current detection voltage Vi exceeds the threshold voltage Vt of the hysteresis comparator 52, the comparison output signal Sc of the hysteresis comparator 52 reverses to the high level as shown by the waveform (e) in FIG. 4.

Although this makes the count value of the counter 53 counted up to the value "1" as shown in the waveform (f) in FIG. 4, the second RS flip-flop circuit 54 stays in the reset state as shown in the waveform (g) in FIG. 4. Consequently, the output signal Sa1 from the AND gate 55 remains at the low level as shown by the waveform (h) in FIG. 4; the output signal Sa3 from the AND gate 56 remains at the low level as shown by the waveform (i) in FIG. 4; and the bottom detection signal Sb from the OR gate 60 remains at the low level as well as shown by the waveform (m) in FIG. 4.

The current detection voltage Vi continues to increase until the moment of time t5 when the current detection voltage Vi reaches the level shift voltage Vf, strictly stating, a shifted voltage of a difference voltage between the feedback signal Vf and the output voltage from the slope compensation circuit 35. At this moment of time t5, the comparison signal Sc1 from the comparator 44 in FIG. 2 reverses to the high level and delivered to the reset terminal R of the RS flip-flop circuit 38. Consequently, this RS flip-flop circuit 38 is reset and the output signal Sf therefrom is reversed to the low level as shown by the waveform (b) in FIG. 4.

Accordingly, the output signal Sa0 from the AND gate 40 reverses to the low level to change the gate driving signal Vg from the gate driver 41 to the low level and turn the switching element 8 OFF. Corresponding to the reversal of the output signal Sf from the RS flip-flop circuit 38 to the low level, a one-shot signal Ss2 is delivered from the third one-shot circuit 61 as shown by the waveform (o) in FIG. 4.

Consequently, the drain voltage Vd of the switching element 8 becomes a high voltage as shown by the waveform (c) in FIG. 4. Since the switching element 51 is turned ON by the one-shot signal Ss2, the current detection voltage Vi becomes approximately zero at this moment of time t5 as shown by the waveform (d) in FIG. 4, which is lower than the threshold voltage Vt of the hysteresis comparator 52, and the comparison output Sc changes to the low level. At this time, the flyback transformer is in a state supplying an electric power to the secondary winding L2.

The one-shot signal Ss2 delivered at the time t5 resets the counter 53 to clear the count value to zero. The one-shot signal Ss2 also resets the second RS flip-flop circuit 54 and the output voltage Sf2 remains at the low level as shown by the waveform (g) in FIG. 4.

After that, at the moment of time t6 when the one-shot signal Ss2 returns to the low level, the current detection voltage Vi is released from the pull down state. A positive voltage that is similar to the one in the primary winding L1 of the flyback transformer 7 is delivered from the auxiliary winding L3 to the current detection signal input terminal IS through the voltage adjusting circuit 24.

Consequently, the current detection voltage Vi becomes higher than the threshold voltage Vf at the moment of time t6 and stays at that constant voltage as shown by the waveform (d) in FIG. 4. The comparison signal Sc from the hysteresis comparator 52 reverses to the high level as shown by the waveform (e) in FIG. 4 and the count value of the counter 53 counts up to "1" as shown by the waveform (f) in FIG. 4.

After that, at the moment of time t7 when the power supplying state to the secondary winding L2 of the flyback transformer 7 finishes, an LC resonance oscillation state (or a pseudo resonance state) arises caused by an inductance component of the primary winding L1 of the flyback transformer 7 and capacitance components of a parasitic capacitance connected to the drain terminal of the switching element 8 and of a capacitance of a capacitor for a noise filter (not illustrated in the figures). The drain voltage Vd of the switching element 8 oscillates with a gradually damping amplitude as shown by the waveform (c) in FIG. 4. In this resonant oscillation state, a waveform similar to the oscillating waveform is delivered from the auxiliary winding L3 through the voltage adjusting circuit 24 to the current detection signal input terminal IS. The semiconductor control device 15 recognizes this signal delivered to the terminal IS as a current detection voltage signal Vi.

At this moment of time t7, the current detection voltage Vi decreases to a value lower than the threshold value Vt and the comparison signal Sc from the hysteresis comparator 52 changes to the low level as shown by the waveform (e) in FIG. 4. After that, at the moment of time t8 when the current detection voltage Vi exceeds the threshold voltage Vt, the comparison signal Sc from the hysteresis comparator 52 changes to the high level and the count value of the counter 53 counts up to "2" as shown in the waveform (f) in FIG. 4.

An output signal of a high level pulse is delivered from the counter 53 to the set terminal S of the second RS flip-flop circuit 54 to set the second RS flip-flop circuit 54 and reverses the output signal Sf2 from the second RS flip-flop circuit 54 to the high level at this moment of time t8 as shown by the waveform (g) in FIG. 4. Since the both input signals to the AND gate 55 become the high level, the output Sa1 from the AND gate 55 becomes the high level and the output from the inverter IN becomes the low level. The AND gate 56 receives the low level signal from the inverter IN to close the AND gate 56, which means that the output from the AND gate 56 is fixed to the low level.

After that, at the moment of time t9 when the oscillation signal of the oscillator 34 becomes to the high level and the one-shot signal Ss is delivered from the one-shot circuit 37 as shown by the waveform (a) in FIG. 4, the one-shot signal Ss is interrupted by the AND gate 56, which is in the closed state, and inhibited to be transferred to the OR gate 60. The one-shot signal Ss is simultaneously delivered to the clock input terminal C of the D flip-flop circuit 57 of the bottom detection circuit BD. Since the output signal Sa1 from the AND gate 55 delivered to the data terminal D is at the high level, the output signal Sd from the D flip-flop circuit 57 changes to the high level as shown by the waveform (j) in FIG. 4.

As a result, the output signal Sa2 from the AND gate 58 changes to the high level as shown by the waveform (k) in FIG. 4. Nevertheless, the second one-shot circuit 59 does not operate, holding the output Sbd at the low level as shown by the waveform (l) in FIG. 4.

After that, at the moment of time t10, the one-shot signal Ss returns to the low level. At the moment of time t11 when the current detection voltage Vi decreases to zero, which is lower than the threshold voltage Vt, the comparison signal Sc from the hysteresis comparator 52 reverses to the low level as shown by the waveform (e) in FIG. 4, correspondingly reversing the output signal Sa1 from the AND gate 55 to the low level as shown by the waveform (h) in FIG. 4.

As a result, the output signal Sa2 from the AND gate 58 also reverses to the low level as shown by the waveform (k) in FIG. 4 operating the second one-shot circuit 59. The one-shot signal Sbd from the second one-shot circuit 59 reverses to the high level as shown by the waveform (l) in FIG. 4 and is delivered through the OR gate 60 to the set terminal S of the RS flip-flop 38 and to the OR gate 39 as a bottom detection signal Sd.

Thus, the RS flip-flop circuit 38 is set to deliver the output signal Sf at the high level as shown by the waveform (b) in FIG. 4. As a consequence, gate driving signal Vg at the high level is delivered from the gate driver 41 to the switching element 8 to turn the switching element 8 ON.

Thus, the switching element 8 turns ON at a low drain voltage Vd. The drain voltage Vd of the switching element 8 returns to zero from a low voltage condition, which is a bottom state, to suppress the switching loss.

If the one-shot signal Ss from the one-shot circuit 37 is delivered during the time period from t7 to t8 or from t11 to t13, in which the drain voltage Vd of the switching element 8 is at a low voltage, the current detection voltage signal Vi is at a low voltage as well and the comparison signal Sc from the comparator 52 is at the low level, maintaining the output signal Sa1 from the AND gate 55 at the low level. Since the AND gate 56 is accordingly opened, the one-shot signal Ss passes through the OR gate 60 and is delivered, as a bottom detection signal Sb, to the set terminal S of the RS flip-flop circuit 38. Thus, a gate driving signal Vg at the high level is delivered from the gate driver 41 to turn the switching element 8 ON. In this case, too, the drain voltage Vd of the switching element 8 returns to zero from a low voltage state, which is a bottom state, and thus, the switching loss is reduced.

In the embodiment described above, the output voltage from the auxiliary winding (tertiary winding) L3 similar to the voltage of the primary winding L1 of the flyback transformer 7 is delivered, through the voltage adjusting circuit 24, to the current detection signal input terminal IS of the semiconductor control device 15. Consequently, the current detection voltage Vi in the turned OFF state of the switching element 8 is made similar to the waveform of the drain voltage Vd of the switching element 8. Since bottom detection process is carried out in the bottom detection section 48 based on this current detection voltage Vi, the switching element 8 is turned ON only in a low voltage state of the drain voltage Vd of the switching element 8, by means of the semiconductor control device 15 having the same number of pins as that of the conventional example of FIG. 5. Therefore, the semiconductor control device 15 achieves reduction of switching loss and enhancement of efficiency without increase in manufacturing costs due to increase in the number of pins.

Moreover, in the resonant oscillation operation state, the turning ON of the switching element 8 is controlled to be executed at the timing of bottom detection after the one-shot circuit 37 delivers a one-shot signal triggered by the oscillator 34, frequency of which is controlled according to the signal Vf that indicates the degree of loading. Therefore, the semiconductor control device provides the optimum switching frequency characteristics fitted to the loading condition.

In the embodiment described above, the switching element 8 is an N-channel MOS field effect transistor. However, the switching element is not limited to the N-channel MOS field effect transistor, but can be a P-channel MOS field effect transistor. In that case, the logic of the gate driving signal Vg from the gate driver 41 is inverted and delivered to the gate. In addition, the switching element 8 is not limited to a field effect transistor, but can be any semiconductor switching element such as a bipolar transistor, an IGBT and the like. In the embodiment described above, the DC voltage delivered to the primary winding L1 of the flyback transformer 7 is obtained by converting an AC voltage to the DC voltage by the rectifier 4. However, the DC voltage is obtained not only by that means but also by an AC-DC converter or a DC power supply.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments can be combined, as would be understood by one of skill in the art.

This application is based on, and claims priority to, Japanese Patent Application No. 2010-246639, filed on Nov. 2, 2010. The disclosure of the priority application, in its entirety, including the drawings, claims, and the specification thereof, is incorporated herein by reference.

What is claimed is:

1. A semiconductor control device for a switching regulator that has a switching element connected in series to a primary winding of a flyback transformer and connects a secondary winding of the flyback transformer to an external load, the semiconductor control device driving the switching element and comprising:
   a current detection signal input terminal that receives a signal of detected current flowing in the switching element;
   a feedback signal input terminal that receives a feedback signal of detecting a loading condition of the secondary winding;
   a driving signal output terminal that delivers a signal for driving the switching element;
   a voltage adjusting circuit that connects an output terminal of an auxiliary winding of the flyback transformer, the auxiliary winding having a polarity opposite to the primary winding, to the current detection signal input terminal during an OFF period of the switching element;
   an oscillator circuit that is connected to the feedback signal input terminal;
   a one-shot circuit that generates a one-shot pulse based on an output voltage from the oscillator circuit;
   an RS flip-flop circuit that generates a driving signal to be delivered to the driving signal output terminal; and
   a bottom detection section that receives a one-shot signal from the one-shot circuit, the signal delivered to the current detection signal input terminal, and an output signal from the RS flip-flop circuit, and sets the RS flip-flop circuit based on the one-shot signal or a bottom detection signal of detecting a bottom of the signal delivered to the current detection signal input terminal during the OFF period of the switching element;
   wherein the bottom detection section comprises:
   a pull-down circuit that pulls down the current detection signal input terminal upon receiving the output signal from the RS flip-flop circuit;
   a hysteresis comparator that is connected to the current detection signal input terminal;
   a counter that is counted up every time a comparison output signal from the hysteresis comparator is delivered and is reset upon setting of the RS flip-flop circuit;
   a second RS flip-flop circuit that is set at a predetermined count value of the counter and reset upon setting of the RS flip-flop circuit;
   an AND gate that receives the comparison output signal from the hysteresis comparator and an output signal from the second RS flip-flop circuit;
   a bottom detection circuit that delivers a one-shot signal upon change of an output signal from the AND gate from a high level to a low level;
   a gate circuit that passes the one-shot signal from the one-shot circuit through the gate circuit corresponding to a condition of the output signal from the AND gate at the low level; and
   an OR gate that delivers a set signal to the RS flip-flop circuit, the set signal being a logical sum signal of an output signal from the bottom detection circuit and an output signal from the gate circuit.

2. The semiconductor control device for a switching regulator according to claim 1, wherein the bottom detection circuit comprising:
   a D flip-flop circuit that receives the output signal from the AND gate at a data input terminal and the one-shot signal from the one-shot circuit at a clock terminal;
   a second AND gate that receives an output signal from the D flip-flop circuit and the output signal from the AND gate; and
   a second one-shot circuit that delivers a one-shot signal upon change of an output signal from the second AND gate from the high level to the low level.

3. The semiconductor control device for a switching regulator according to claim 2, wherein the voltage adjusting circuit includes a diode having an anode connected, through a current limiting resistance, to the auxiliary winding and a cathode connected to the current detection signal input terminal, and delivers an output signal from the auxiliary winding to the current detection signal input terminal during the OFF period of the switching element.

4. The semiconductor control device for a switching regulator according to claim 2, wherein the predetermined count value is two.

5. A switching regulator controlling a switching element connected to a primary winding of a flyback transformer by means of the semiconductor control device for the switching regulator of claim 2.

6. The semiconductor control device for a switching regulator according to claim 1, wherein the voltage adjusting circuit includes a diode having an anode connected, through a current limiting resistance, to the auxiliary winding and a cathode connected to the current detection signal input terminal, and delivers an output signal from the auxiliary winding to the current detection signal input terminal during the OFF period of the switching element.

7. A switching regulator controlling a switching element connected to a primary winding of a flyback transformer by means of the semiconductor control device for the switching regulator of claim 6.

8. The semiconductor control device for a switching regulator according to claim 1, wherein the predetermined count value is two.

9. A switching regulator controlling a switching element connected to a primary winding of a flyback transformer by means of the semiconductor control device for the switching regulator of claim 1.

10. A method of controlling a switching regulator that has a switching element connected in series to a primary winding of a flyback transformer and connects a secondary winding of the flyback transformer to an external load, the method comprising the steps of:
   receiving, at a current detection signal input terminal, a signal of detected current flowing in the switching element;
   receiving, at a feedback signal input terminal, a feedback signal of detecting a loading condition of the secondary winding;
   delivering, from a driving signal output terminal, a signal for driving the switching element
   connecting, by a voltage adjusting circuit, an output terminal of an auxiliary winding of the flyback transformer, the auxiliary winding having a polarity opposite to the primary winding, to the current detection signal input terminal during an OFF period of the switching element;
   generating, by a one-shot circuit, a one-shot pulse based on an output voltage from an oscillator circuit connected to the feedback signal input terminal;
   generating, by an RS flip-flop circuit, a driving signal to be delivered to the driving signal output terminal;
   receiving, by a bottom detection section, a one-shot signal from the one-shot circuit, the signal delivered to the current detection signal input terminal, and an output signal from the RS flip-flop circuit, and setting, by the bottom detection section, the RS flip-flop circuit based on the one-shot signal or a bottom detection signal of detecting a bottom of the signal delivered to the current detection signal input terminal during the OFF period of the switching element;

pulling down, by a pull-down circuit, the current detection signal input terminal upon receiving the output signal from the RS flip-flop circuit;

counting up a counter every time a comparison output signal from a hysteresis comparator is delivered and resetting the counter upon setting of the RS flip-flop circuit, wherein the hysteresis comparator that is connected to the current detection signal input terminal;

setting a second RS flip-flop circuit at a predetermined count value of the counter and resetting the second RS flip-flop circuit upon setting of the RS flip-flop circuit;

receiving, by an AND gate, the comparison output signal from the hysteresis comparator and an output signal from the second RS flip-flop circuit;

delivering, by a bottom detection circuit, a one-shot signal upon change of an output signal from the AND gate from a high level to a low level;

passing, by a gate circuit, the one-shot signal from the one-shot circuit through the gate circuit corresponding to a condition of the output signal from the AND gate at the low level; and delivering, by an OR gate, a set signal to the RS flip-flop circuit, the set signal being a logical sum signal of an output signal from the bottom detection circuit and an output signal from the gate circuit.

* * * * *